Patented Aug. 18, 1925.

1,549,886

UNITED STATES PATENT OFFICE.

CHAUNCEY C. LOOMIS, OF YONKERS, AND HORACE E. STUMP, OF BROOKLYN, NEW YORK, ASSIGNORS, BY MESNE ASSIGNMENTS, TO THE HEVEA CORPORATION, A CORPORATION OF NEW YORK.

METHOD OF PREPARING SULPHUR IN COLLOIDAL FORM.

No Drawing.    Application filed April 26, 1923. Serial No. 634,907.

*To all whom it may concern:*

Be it known that we, CHAUNCEY C. LOOMIS, of Yonkers, Westchester Co., New York, and HORACE E. STUMP, of Brooklyn, Kings Co., New York. citizens of the United States, residing in as above noted, in the counties of as above noted and State of New York, have invented a new and useful Improvement in Methods of Preparing Sulphur in Colloidal Form, of which the following is a specification.

This invention relates to the preparation of sulphur in colloidal form, and while it has for its object more particularly the preparation of sulphur in this form for use in connection with natural latices, it will be manifest that the invention has other and valuable application.

A principal object of the invention is the provision of sulphur in such form that upon its addition to or mixing with a faintly alkaline solution it will have colloidal properties.

A preferred embodiment of the process of practicing the present invention is to introduce sulphur into an alkali-metal sulphide to the point of saturation. A suitable protective colloid is then added, this preferably being rosin soap, and the solution is acidified. The sulphur on acidification is precipitated in white lumps, which can be readily separated out by filtering or otherwise. After the sulphur is thrown into water and washed to remove metallic salts, the precipitated sulphur can be dried and kept without losing the property of dispersing to a colloid in faintly alkaline solution.

In acidifying the sulphide, we preferably use gaseous sulphur dioxide, as this will combine with the liberated hydrogen sulphide to increase the yield of colloidal sulphur.

We claim:

1. The method of preparing sulphur in colloidal form, which consists in, adding sulphur to an alkali-metal sulphide solution, introducing into said solution a protective colloid, acidifying and separating the precipitate.

2. The method of preparing sulphur in colloidal form, which consists in, adding sulphur to an alkali-metal sulphide solution to the point of saturation, introducing into said solution a protective colloid, acidifying and separating the precipitate.

3. The method of preparing sulphur in colloidal form, which consists in, adding sulphur to a solution of alkali-metal sulphide, precipitating the same in the presence of a protective colloid, washing and drying.

4. The method of preparing sulphur in colloidal form, which consists in, introducing sulphur into a solution of alkali-metal sulphide, adding a protective colloid, and acidifying the solution.

5. The method of preparing sulphur in colloidal form, which consists in, adding sulphur to a solution of alkali-metal sulphide, introducing into said solution a soap, acidifying and separating the precipitate.

6. The method of preparing sulphur in colloidal form, which consists in, adding sulphur to a solution of alkali-metal sulphide, introducing into said solution a soap, acidifying and separating the precipitate, and then again dispersing the precipitate by treatment with a faintly alkaline solution.

7. The product consisting of a mixture of sulphur and a soap forming acid precipitated together from solution.

8. A process for making colloidal sulphur which consists in adding a colloid to a solution of a polysulphide of a non-volatile base, acidifying this solution and filtering and washing the precipitated sulphur.

9. A process for making colloidal sulphur which consists in adding a colloid to a solution of a polysulphide of a non-volatile alkali-metal, acidifying the solution and filtering and washing the precipitated sulphur.

CHAUNCY C. LOOMIS.
HORACE E. STUMP.